United States Patent
Bechtler et al.

(10) Patent No.: US 9,073,580 B2
(45) Date of Patent: Jul. 7, 2015

(54) TRANSVERSE STRUT

(71) Applicant: Dr. Ing. h.c. F. Porsche Aktiengesellschaft, Suttgart (DE)

(72) Inventors: Frank Bechtler, Stuttgart (DE); Matthias Herntier, Friolzheim (DE); Bernd Fritz, Bad Duerrheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/486,404

(22) Filed: Sep. 15, 2014

(65) Prior Publication Data

US 2015/0076867 A1     Mar. 19, 2015

(30) Foreign Application Priority Data

Sep. 17, 2013  (DE) .......................... 10 2013 110 207

(51) Int. Cl.
  *B60N 99/00*   (2006.01)
  *B62D 25/08*   (2006.01)
(52) U.S. Cl.
  CPC .................................... B62D 25/082 (2013.01)
(58) Field of Classification Search
  CPC ..................................................... B62D 25/082
  See application file for complete search history.

(56) References Cited

U.S. PATENT DOCUMENTS

| 5,411,311 A | 5/1995 | Shimmell et al. |
| 5,417,454 A * | 5/1995 | Adams .......................... 280/794 |
| 7,055,837 B2 * | 6/2006 | Noble .................... 280/124.155 |
| 8,708,403 B2 | 4/2014 | Herntier et al. |

FOREIGN PATENT DOCUMENTS

| DE | 102009005942 | 7/2010 |
| JP | 2006-111162 | 4/2006 |
| JP | 2009-023618 | 2/2009 |

* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A transverse strut has two arms arranged in a V-shaped manner, and a first connecting element connects the two arms facing end regions thereof and for fastening the transverse strut in the front end of a motor vehicle. Second and third connecting elements are provided respectively at distal end regions of the arms. The second and third connecting elements are connected to the respective arms and function for the connection of the transverse strut. The arms and the connecting elements are formed as extruded profiles and/or formed sheet metal parts.

11 Claims, 2 Drawing Sheets

TRANSVERSE STRUT

CROSS-REFERENCE TO RELATED APPLICATION

This application claims priority under 35 USC 119 to German Patent Application No. 10 2013 110 207.7 file on Sep. 17, 2013, the entire disclosure of which is incorporated herein by reference.

BACKGROUND

1. Field of the Invention

The invention relates to a transverse strut, in particular for the front end of a motor vehicle, and to a motor vehicle with such a transverse strut.

2. Description of the Related Art

Transverse struts are used in the front end of motor vehicles to improve the static and dynamic rigidity of the motor vehicle.

U.S. Pat. No. 5,411,311 discloses a transverse strut in the form of a trapezoidal structure with a base, two arms that project from the base to spring domes and a connecting strut connected between the spring domes. Connecting elements are attached to ends of the arms and to the connecting strut to connect the arms and the connecting strut to the respective spring domes.

However, the arms and the connecting strut are formed from a bent tube and therefore the manufacturing outlay is relatively high because of the cutting of the individual parts to size and the connection of the individual parts.

It is therefore the object of the invention to provide a transverse strut that is constructed and can be produced relatively simply and cost-effectively in comparison to the transverse struts in the prior art.

SUMMARY OF THE INVENTION

The invention relates to a transverse strut with two arms arranged in a V-shaped manner. A first connecting element is provided for connecting the two arms at facing end regions thereof and for fastening the transverse strut in the front end of a motor vehicle. Second and third connecting elements are provided respectively at the distal end regions of the arms. The connecting elements are connected to the respective arms and function to connect the transverse strut. The arms and the connecting elements are formed as extruded profiles and/or formed sheet metal parts.

A strut may be provided between the arms in the region of the first connecting element. The strut connects the arms in the region of the first connecting element and reinforces the transverse strut.

The first connecting element may connect the facing end regions of the arms and optionally the one strut. As a result, the V-shaped arrangement of the arms can be connected by a first connecting element, for example by welding or a form-fitting connection.

The strut and the first connecting element may be extruded profiles. Thus, simple production of the components can be achieved.

The second and/or third connecting element may be formed sheet metal parts. Thus, the second and the third connecting elements can be produced cost-effectively and can readily be adapted to the vehicle regions to be connected.

The arms, the strut and/or the first, second and/or third connecting element may be of metal, such as aluminum.

DETAILED DESCRIPTION

Figure 1:
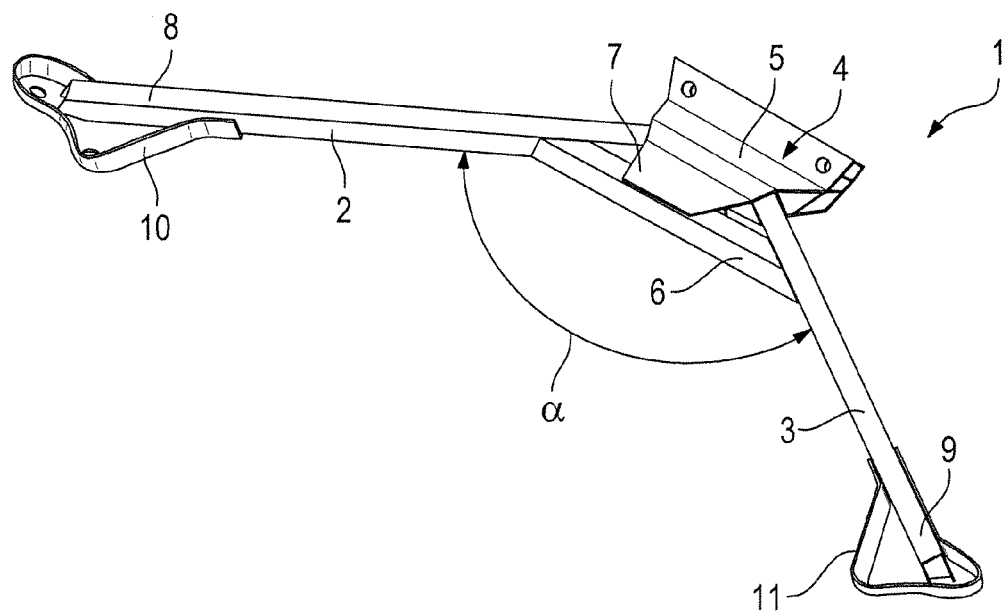
FIG. 1 is a view of a transverse strut according to the invention.

FIG. 1 shows a transverse strut 1 for use in a motor vehicle between a cowl or a cross member and the two spring strut domes.

The transverse strut 1 is formed with two arms 2, 3 arranged in a V-shaped manner and arranged at an obtuse angle α with respect to each other. The angle α is more than 90° and less than 180°, in particular approximately 120° to 150°. A connecting element 4 connects the two arms 2, 3 to each other in the region in which the facing ends of the arms 2, 3 come close to each other. The connecting element 4 has a flange plate 5 for fastening to the cowl or to the cross member.

A strut 6 also optionally is provided between the two arms 2, 3 in the region of the connecting element and connects the two arms 2, 3 to each other while also being connected to the connecting element 4. For this purpose, the connecting element has a tab 7 that rests on the strut 6.

Second and third connecting elements 10, 11 are arranged respectively at the distal end regions 8, 9 of the arms 2, 3.

The second and the third connecting elements 10, 11 are connected to the respective arms 2, 3 and function for connecting the transverse strut 1 to a respective spring strut dome, for example in the front end of a motor vehicle.

The arms, the strut and/or the connecting elements advantageously are extruded profiles and/or formed sheet metal parts. For this purpose, the extruded profiles and formed sheet metal parts are produced from metal, such as aluminum or an aluminum alloy.

Figure 2:
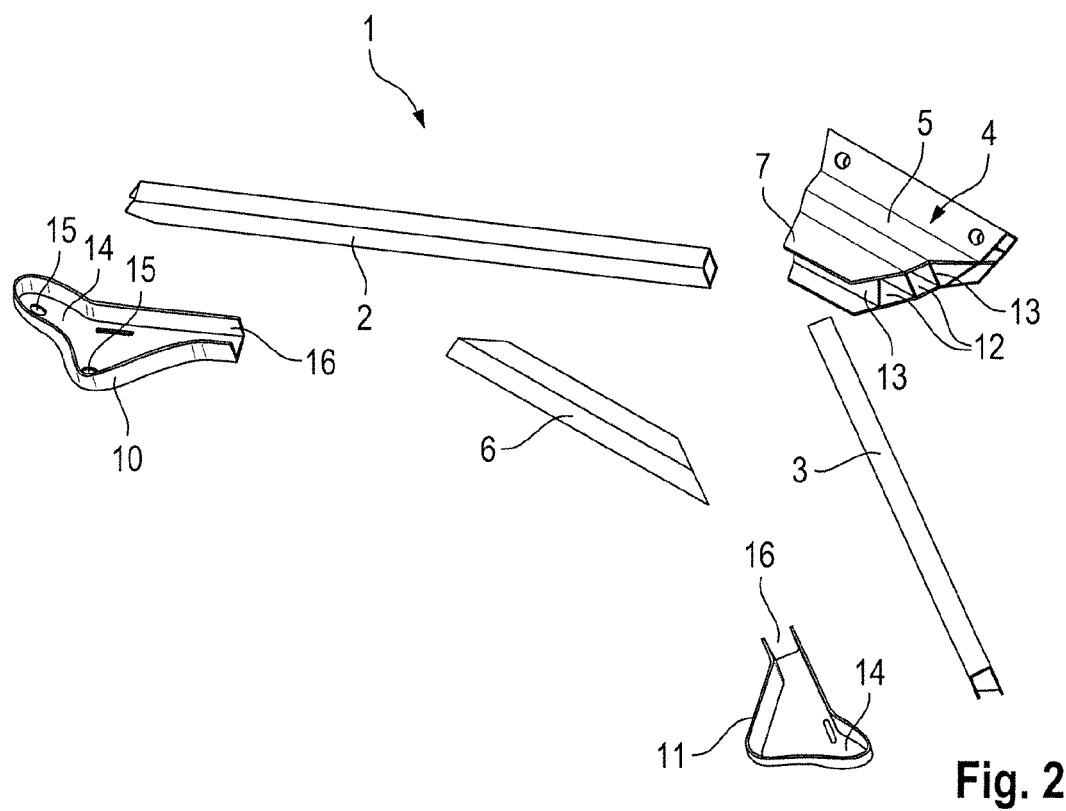
FIG. 2 is an exploded perspective view of the transverse strut.

FIG. 2 shows the transverse strut 1 in an exploded illustration. It is seen that the first connecting element 4 has chambers 12 that are separated from one another by struts 13. This imparts additional rigidity to the first connecting element 4. The second and third connecting elements 10, 11 are provided with plate-like end regions 14, by means of which said connecting elements can be connected to a spring strut dome. The end regions have connecting or screw openings 15 for fastening to the respective spring strut dome. The end regions also have guide tracks 16 for receiving the respective arms 2, 3. The guide tracks are formed by two adjacent, raised edges.

The arms 2, 3 and the strut 6 are advantageously designed as U profiles.

The structural elements are preferably connected to one another by welding, such as by MIG welding or by laser welding or the like.

Figure 3:
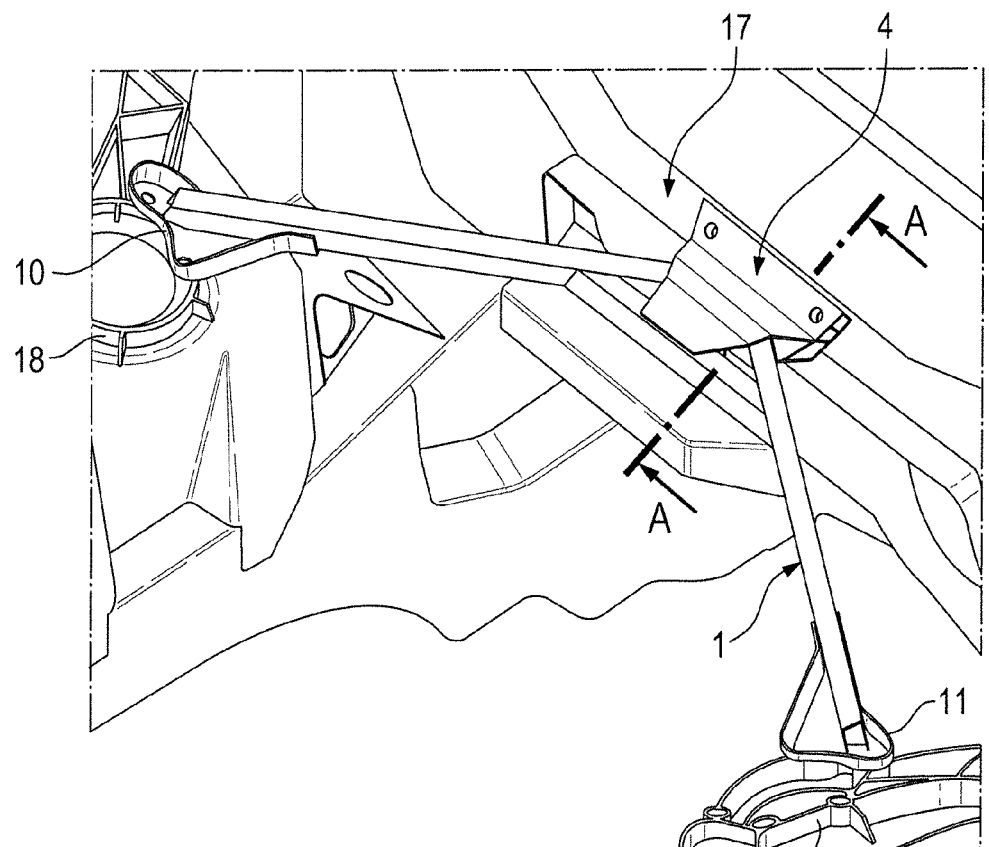
FIG. 3 is a view of the transverse strut when installed in the front end.

FIG. 3 shows the arrangement of the transverse strut 1 between the cowl 17 and the spring strut domes 18. In this case, the first connecting element 4 is connected to the cowl 17 and the second and third connecting elements 10, 11 are connected to the respective spring strut domes 18.

Figure 4:
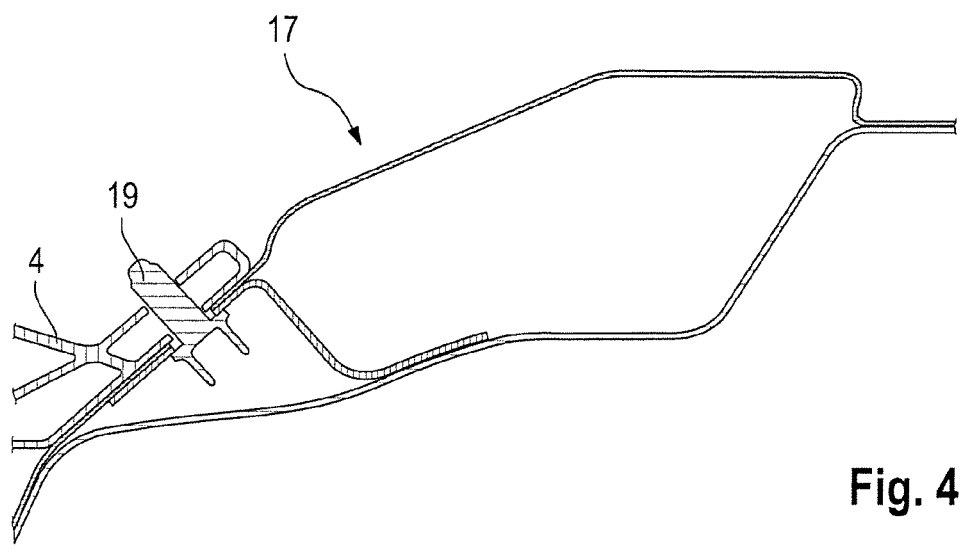
FIG. 4 is a cross-section taken along line A-A in FIG. 3.

FIG. 4 shows the section A-A from FIG. 3. It can be seen that the cowl 17 is designed as a multi-layered element, to which the connecting element 4 is fastened by means of a connecting means 19, for example is inserted into or screwed to the connecting element 4.

What is claim is:

1. A transverse strut comprising: two linear arms, each arm being an extruded profile with opposite front and rear ends and having a substantially uniform extruded shape at all locations between the front and rear ends, the arms being arranged in a V-shape with the front ends being in proximity to one another and the rear ends diverging from one another; a first connecting element defining a linearly extruded profile having opposite ends and a substantially uniform extruded shape at all locations between the ends, the first connecting element connecting the front ends of the arms and fastening the transverse strut in a front end of a motor vehicle, second and third connecting elements defining formed sheet metal parts having concave guide tracks nested with the rear ends of the arms, the second and third connecting elements being connected to the respective arms and serving for connecting the transverse strut to the motor vehicle.

2. The transverse strut of claim 1, further comprising a strut between the arms in a region of the first connecting element.

3. The transverse strut of claim 2, wherein the first connecting element connects the facing end regions of the arms and the one strut.

4. The transverse strut of claim 2, wherein the strut is an extruded profiles extending linearly between the first and second arms and having a substantially uniform extruded shape at all locations thereon between the arms.

5. The transverse strut of claim 2, wherein the arms, the strut and the first, second and third connecting elements are made of metal.

6. The transverse strut of claim 5, wherein the metal is aluminum or an aluminum alloy.

7. The transverse strut of claim 2, wherein the first connecting element has a plurality of chambers extending between opposite ends of the first connecting element, the chambers being separated from one another by webs extending between opposite ends of the first connecting element.

8. The transverse strut of claim 7, wherein front ends of the first and second arms are received in opposite ends of one of the chambers of the first connecting element.

9. The transverse strut of claim 7, wherein the first connecting element has a rearwardly open channel, the strut being nested in the rearwardly open channel of the first connecting element.

10. The transverse strut of claim 7, wherein the first and second arms define hollow extruded profiles.

11. The transverse strut of claim 2, wherein each of the arms has an extruded substantially rectangular cross-sectional shape, and wherein the concave guide track formed in each of the second and third connecting elements comprises a substantially rectangular channel that engages the rear ends of the first and second arms.

* * * * *